(12) United States Patent
Amanuma et al.

(10) Patent No.: US 7,100,558 B2
(45) Date of Patent: Sep. 5, 2006

(54) CONTROL APPARATUS FOR AUTOMATIC STARTING/STOPPING INTERNAL COMBUSTION ENGINE

(75) Inventors: Hirokatsu Amanuma, Utsunomiya (JP); Yusuke Tatara, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 247 days.

(21) Appl. No.: 10/911,629

(22) Filed: Aug. 5, 2004

(65) Prior Publication Data
US 2005/0045134 A1 Mar. 3, 2005

(30) Foreign Application Priority Data
Aug. 26, 2003 (JP) .............. 2003-301390

(51) Int. Cl.
*F02N 11/08* (2006.01)
(52) U.S. Cl. .................................. 123/179.4
(58) Field of Classification Search ............. 123/179.4, 123/179.3
See application file for complete search history.

(56) References Cited

U.S. PATENT DOCUMENTS 6,912,840 B1 * 7/2005 Posselt et al. ............. 60/274
6,935,101 B1 * 8/2005 Morinaga et al. ............. 60/284

FOREIGN PATENT DOCUMENTS

JP 09156382 A * 6/1997

* cited by examiner

*Primary Examiner*—Henry C. Yueo
*Assistant Examiner*—Arnold Castro
(74) *Attorney, Agent, or Firm*—Arent Fox PLLC

(57) ABSTRACT

A CAT temperature sensor which detects the temperature of a catalyst (catalyst temperature TCAT) is provided in an exhaust purification apparatus of an exhaust pipe, and an exhaust vent temperature sensor which detects the temperature of an exhaust vent (exhaust vent TEND) is provided in near the exhaust vent. A FIECU, in the case where the catalyst temperature TCAT is above a predetermined temperature TCAT1, or in the case where a temperature difference ΔT obtained by subtracting the catalyst temperature TCAT from the exhaust vent temperature TEND is above a predetermined temperature difference ΔT1, sets the flag value of a flooding determination flag F_INUN to "1", and sets the flag value of an idle rotation speed increase flag F_INEUP which indicates that a target engine speed in the idle operating state of the internal combustion engine is increased by a predetermined rotation speed, to "1".

8 Claims, 14 Drawing Sheets

CONTROL APPARATUS FOR AUTOMATIC STARTING/STOPPING INTERNAL COMBUSTION ENGINE

BACKGROUND OF THE INVENTION

1. Field of the Invention

The present invention relates to a control apparatus for automatic starting/stopping an internal combustion engine.

Priority is claimed on Japanese Patent Application No. 2003-301390 filed on Aug. 26, 2003, the content of which is incorporated herein by reference.

2. Description of Related Art

Conventional hybrid vehicles are equipped with internal combustion engines and motors and either one of these provide the driving force for the vehicle to move. In such hybrid vehicles, a hybrid vehicle has been known that includes: an idle stop device which automatically stops the operation of the internal combustion engine when the vehicle is stopped due for example to the driver using the brakes, and automatically restarts the internal combustion engine when the internal combustion engine is stopped and it is detected that the driver has released the brakes; a flooding prevention device which prevents flooding of the exhaust pipes of the internal combustion engine; and a flooding removal device which removes water that has entered the exhaust pipe of the internal combustion engine (for example, refer to Japanese Unexamined Patent Application, First Publication No. H11-353995).

In this hybrid vehicle, the flooding prevention device includes, for example, a valve which blocks the exhaust pipe, and an actuator which changes an arrangement of the exhaust pipe. The flooding removal device includes, for example, a control device which starts the internal combustion engine so as to discharge water from the exhaust pipe by the exhaust pressure, or opens a drain valve equipped in the exhaust pipe.

If the water level outside the vehicle increases above a predetermined level and enters the exhaust system including a catalytic apparatus used for exhaust purification, it can negatively affect the exhaust system. The flooding prevention device is designed to prevent such an effect.

However, in the hybrid vehicle according to the example in the prior art above, the function of the flooding removal device is to prevent further flooding once it is detected that water has entered the exhaust pipe, and it does not necessarily obstruct water from entering the exhaust system.

SUMMARY OF THE INVENTION

The present invention takes the abovementioned situation into consideration with an object of providing a control apparatus for automatic starting/stopping an internal combustion engine which prevents water from entering the exhaust system of the internal combustion engine from the outside of the vehicle.

The present invention is a control apparatus for automatic for starting/stopping an internal combustion engine which automatically stops or automatically starts an internal combustion engine provided as a driving source of a vehicle, depending on a driving state of the vehicle, including; a flooding determination device which determines whether there is a possibility of flooding into an exhaust system of the internal combustion engine or not; and an automatic stop prohibiting device which prohibits the execution of automatic stopping of the internal combustion engine in a case where the flooding determination device determines that there is a possibility of flooding into the exhaust system of the internal combustion engine.

According to the present invention, if the determination is that there is a possibility of flooding occurring into the exhaust system of the internal combustion engine, by prohibiting the automatic stopping of the internal combustion engine in an operating state, it is possible to maintain the desired exhaust pressure in the internal combustion engine, and to prevent water from entering the exhaust system of the internal combustion engine equipped with an exhaust gas purification apparatus and the like, from the outside of the vehicle.

In the control apparatus for automatic starting/stopping an internal combustion engine of the present invention, preferably there is provided a starting device which automatically starts the internal combustion engine when in a stopped condition, in a case where the flooding determination device determines that there is a possibility of flooding into the exhaust system of the internal combustion engine.

According to the present invention, by automatically starting the internal combustion engine before reaching a condition where flooding occurs in the exhaust system of the internal combustion engine, it is possible to maintain a desired exhaust pressure in the internal combustion engine, and to prevent water from entering the exhaust system of the internal combustion engine equipped with an exhaust gas purification apparatus or the like, from the outside of the vehicle.

In the control apparatus for automatic starting/stopping an internal combustion engine of the present invention, preferably there is provided a temperature sensor which detects an exhaust gas temperature or a quantity of state related to the temperature of the exhaust gas, and the flooding determination device determines whether there is a possibility of flooding into the exhaust system of the internal combustion engine or not based on a detection value output from the temperature sensor.

According to the present invention, when an appropriate position of the exhaust system becomes flooded, the specific heat near this position increases. This results in, for example, a decrease in the response to temperature change near this position, with respect to a predetermined temperature change in the temperature of the exhaust gas or of the engine temperature of the internal combustion engine, and a decrease in the temperature change of this area. Due to this, it is possible to determine whether there is a possibility of flooding into the exhaust system of the internal combustion engine or not, based on the detection value output from the temperature sensor installed inside the exhaust system.

In the control apparatus for automatic starting/stopping internal an combustion engine of the present invention, preferably there is provided a plurality of the temperature sensors, and the flooding determination device determines whether there is a possibility of flooding into the exhaust system of the internal combustion engine or not based on a difference between two detection values output from any two of the plurality of temperature sensors.

According to the present invention, the specific heat increases near the position where flooding occurs in the exhaust system. This results in, for example, a decrease in the response to temperature change near this position, with respect to a predetermined temperature change in the temperature of the exhaust gas or of the engine temperature of the internal combustion engine, and a decrease in the temperature change of this area. Due to this, the difference in the two detected values between a temperature sensor located in an area which is not flooded and a temperature sensor near the flooding area, compared to the difference in the detected values between two temperature sensors located in areas which are not flooded, increases above a predetermined temperature difference. As a result, based on the difference in the two detected values output from two temperature sensors chosen from a plurality of temperature sensors provided in the exhaust system, it is possible to determine whether there is a possibility of flooding into the exhaust system of the internal combustion engine or not.

In the control apparatus for automatic starting/stopping an internal combustion engine of the present invention, preferably there is provided a liquid level sensor which is provided near an exhaust vent of the exhaust system in the internal combustion engine, and detects a liquid level position of liquid for detection, or a property related to the liquid level position, and the flooding determination device determines whether there is a possibility of flooding into the exhaust system of the internal combustion engine or not based on a detection value output from the liquid level sensor.

According to the present invention, by using various types of liquid level sensors, for example, float type, optical type, and conduction type liquid level sensors, to detect the liquid level position near the exhaust vent of the exhaust system, such as the water level outside the vehicle, the quantity of state related to the liquid level position, and for example, whether the water level outside the vehicle has exceeded a predetermined water level or not, it is possible to determine whether there is a possibility of flooding into the exhaust system of the internal combustion engine or not.

In the control apparatus for automatic starting/stopping an internal combustion engine of the present invention, preferably there is provided an engine speed increasing device which increases a target engine speed for idle operation of the internal combustion engine by a predetermined amount, in a case where the flooding determination device determines that there is a possibility of flooding into the exhaust system of the internal combustion engine.

According to the present invention, in a case where it is determined that there is a possibility of flooding into the exhaust system of the internal combustion engine, by increasing the target engine speed for the idle operation of the internal combustion engine by a predetermined amount, it is possible to maintain the desired exhaust pressure in the internal combustion engine, and to prevent water from entering the exhaust system of the internal combustion engine equipped with an exhaust gas purification apparatus and the like, from the outside of the vehicle.

In the control apparatus for automatic starting/stopping an internal combustion engine of the present invention, preferably there is provided a motor which is provided as a driving source for the vehicle separate to the internal combustion engine, and a prohibition device which prohibits execution of the automatic stopping operation of the internal combustion engine or prohibits the execution of an operation to drive the vehicle solely under the driving force from the motor, in a case where the flooding determination device determines that there is a possibility of flooding into the exhaust system of the internal combustion engine.

According to the present invention, in a case where it is determined that there is a possibility of flooding into the exhaust system of the internal combustion engine, by prohibiting the automatic stopping of the internal combustion engine in a operating state, it is possible to maintain the desired exhaust pressure of the internal combustion engine, and to prevent water from being sucked into the exhaust gas purification apparatus equipped in the internal combustion engine or the exhaust system. Furthermore, by prohibiting the execution of the operation of driving the vehicle solely under the driving force from the motor, it is possible continue the operation of the internal combustion engine in the driving state of the vehicle and maintain the desired exhaust pressure.

In the control apparatus for automatic starting/stopping an internal combustion engine of the present invention, preferably there is provided a control device which switches from a state where the internal combustion engine in a stopped condition is automatically started, or where the vehicle is driven solely under the driving force from the motor, to a state where the vehicle is driven under the driving force from the internal combustion engine, in a case where the flooding determination device determines that there is a possibility of flooding into the exhaust system of the internal combustion engine.

According to the present invention, by automatically starting the internal combustion engine before flooding occurs in the exhaust system of the internal combustion engine, it is possible to maintain the desired exhaust pressure in the internal combustion engine, and to prevent water from being sucked into the exhaust gas purification apparatus equipped in the internal combustion engine or the exhaust system. Furthermore, by switching from the state where the vehicle is driven solely under the driving force from the motor, to the state where the vehicle is driven under the driving force from the internal combustion engine, it is possible to maintain the desired driving force and the desired exhaust pressure of the internal combustion engine in the driving state of the vehicle.

According to the present invention, by prohibiting the automatic stopping of the internal combustion engine in an operating state, it is possible to maintain the desired exhaust pressure in the internal combustion engine, and to prevent water from entering the exhaust system of the internal combustion engine equipped with an exhaust gas purification apparatus and the like, from the outside of the vehicle.

According to the present invention, by automatically starting the internal combustion engine before reaching a condition where flooding occurs in the exhaust system of the internal combustion engine, it is possible to prevent water from entering the exhaust system of the internal combustion engine equipped with an exhaust gas purification apparatus or the like, from the outside of the vehicle.

According to the present invention, it is possible to determine whether there is a possibility of flooding into the exhaust system of the internal combustion engine or not based on the detection value output from the temperature sensor installed inside the exhaust system.

According to the present invention, based on the difference in the two detected values output from two temperature sensors chosen from a plurality of temperature sensors provided in the exhaust system, it is possible to determine whether there is a possibility of flooding into the exhaust system of the internal combustion engine or not.

According to the present invention, based on the detection result output from the liquid level sensor provided near an exhaust vent of the exhaust system, it is possible to determine whether there is a possibility of flooding into the exhaust system of the internal combustion engine or not.

According to the present invention, even in a case where it is determined that there is a possibility of flooding into the exhaust system of the internal combustion engine, by increasing the target engine speed for the idle operation of the internal combustion engine by a predetermined amount, it is possible to prevent water from entering the exhaust system of the internal combustion engine equipped with an exhaust gas purification apparatus and the like, from the outside of the vehicle.

According to the present invention, it is possible to maintain the desired exhaust pressure in the internal combustion engine, and to prevent water from entering the exhaust system of the internal combustion engine equipped with an exhaust gas purification apparatus and the like, from the outside of the vehicle.

According to the present invention, by automatically starting the internal combustion engine before flooding occurs in the exhaust system of the internal combustion engine, it is possible to prevent water from entering the exhaust system equipped with an exhaust gas purification apparatus and the like, from the outside of the vehicle, when starting the internal combustion engine. Moreover, in a driving state of the vehicle, it is possible to prevent water from entering the exhaust system while maintaining a desired driving force.

DETAILED DESCRIPTION OF THE INVENTION

Hereunder is a description of a control apparatus for automatic starting/stopping an internal combustion engine according to an embodiment of the present invention, with reference to the appended drawings.

Figure 1:
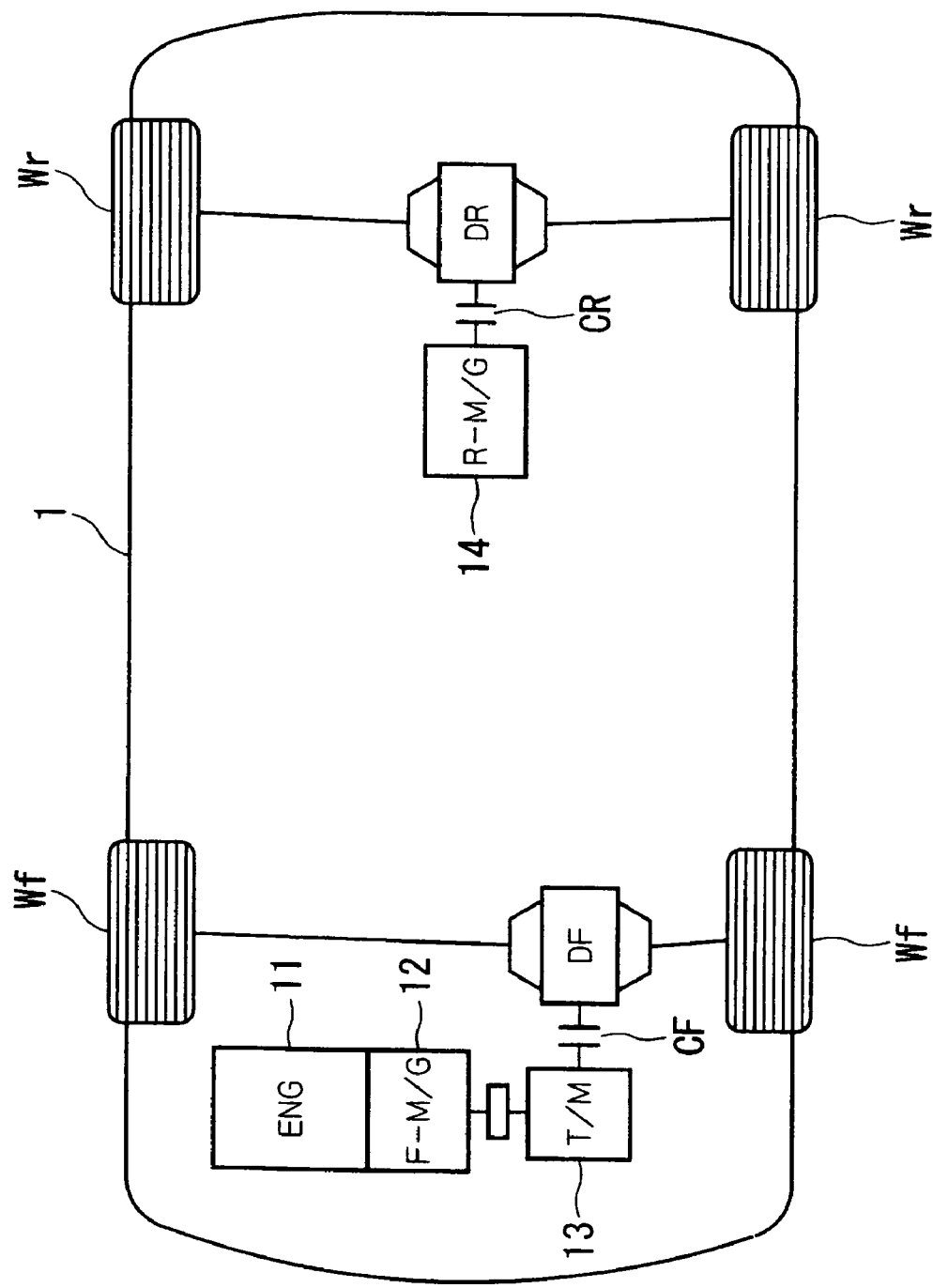
FIG. 1 is a block diagram showing a hybrid vehicle furnished with a control apparatus for automatic starting/stopping an internal combustion engine according to an embodiment of the present invention.
Figure 2:
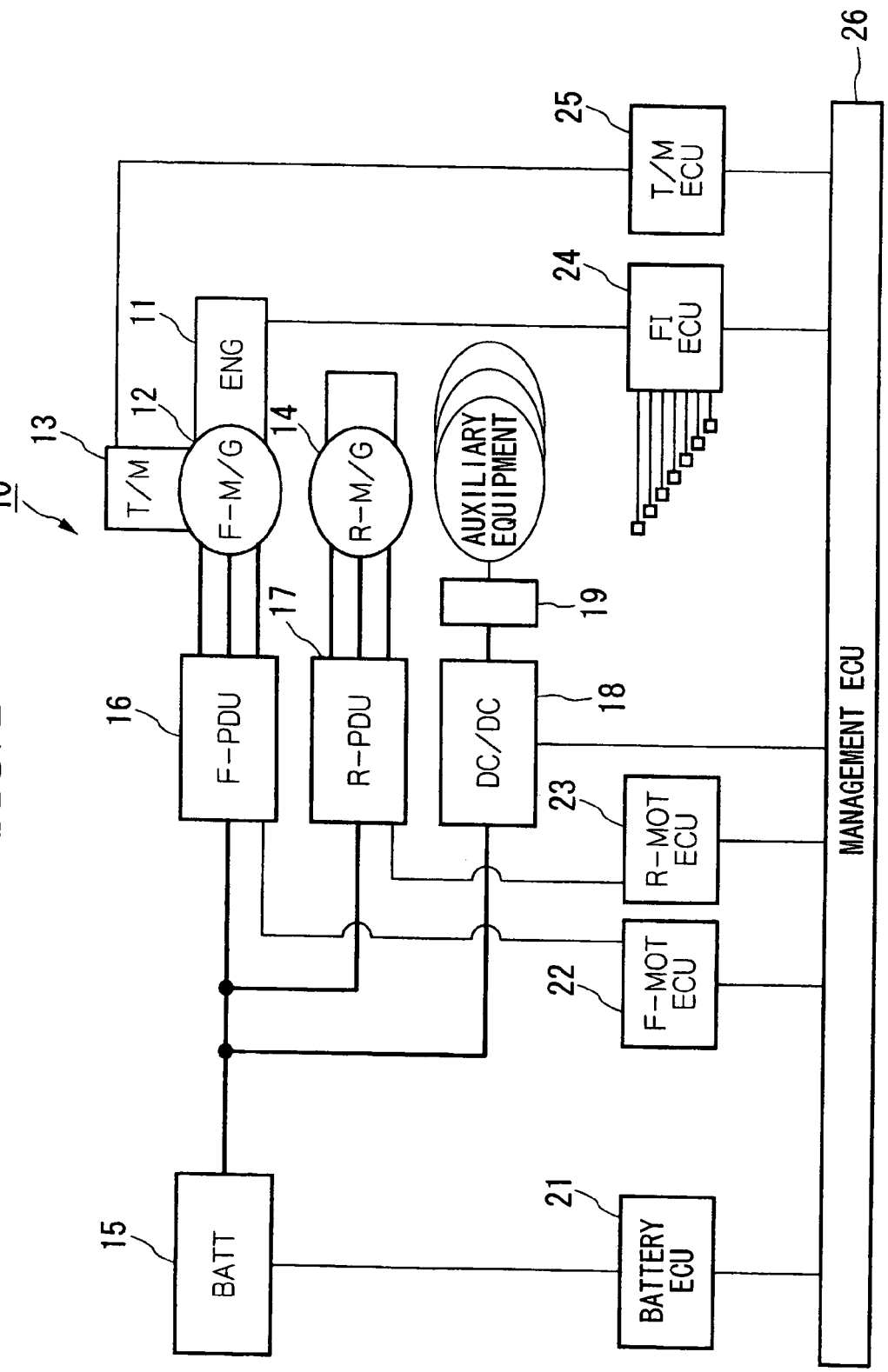
FIG. 2 is a block diagram showing a control apparatus for automatic starting/stopping an internal combustion engine according to an embodiment of the present invention.

The control apparatus for automatic starting/stopping an internal combustion engine 10 according to the present embodiment, for example as shown in FIG. 1, is installed in a four-wheel-drive type hybrid vehicle 1, wherein an internal combustion engine (ENG) 11, a front motor generator (F-M/G) 12 and a transmission (T/M) 13 are connected in series through a front differential DF to the front wheels Wf, and a rear motor generator (R-M/G) 14 is connected through a rear differential DR to the rear wheels Wr. As shown in FIG. 2, the control apparatus includes; a main battery (BATT) 15, a front power drive unit (F-PDU) 16, a rear power drive unit (R-PDU) 17, a DC—DC converter (DC/DC) 18, an auxiliary battery 19, a battery ECU 21, a front motor ECU 22, a rear motor ECU 23, a FIECU 24, a T/MECU 25 and a management ECU 26.

In the hybrid vehicle 1, the driving force from the internal combustion engine 11 and the front motor generator 12 is transferred from the transmission 13 such as an automatic transmission (AT), CVT, or a manual transmission (MT), through a clutch CF, to the front wheels Wf by the front differential DF which distributes the driving force between the left and right front wheels Wf.

The driving force from the rear motor generator 14 is transferred through a clutch CR, to the rear wheels Wr by the rear differential DR which distributes the driving force between the left and right rear wheels Wr.

Here, for example, if the clutch CF equipped in the front differential DF is engaged and the engagement of the clutch CR equipped in the rear differential DR is released, then only the front wheels Wf are driven creating a front wheel drive state. Furthermore, if the clutch CR is engaged, then both the front wheels Wf and the rear wheels Wr are driven creating a four-wheel-drive state. In this four-wheel-drive state, the distribution of driving force between the left and right rear wheels Wr is optionally controllable.

When the hybrid vehicle 1 is decelerating, if the driving force is transferred from the front wheels Wf to the front motor generator 12, and from the rear wheels Wr to the rear motor generator 14, the respective motor generators 12 and 14 function as generators which produce a so-called regenerative braking force, recovering the kinetic energy of the car body as electrical energy.

The driving and regeneration (power generation) operations of the respective motor generators 12 and 14 are performed by the respective power drive units 16 and 17 upon reception of control instructions from the respective motor ECUs 22 and 23.

To the power drive units 16 and 17 equipped for example with PWM inverters using pulse width modulation (PWM), is connected the main battery 15 of a high voltage system which performs transfer of electrical energy with the motor generators 12 and 14. This main battery 15 has a plurality of modules connected in series, where a module consists of a plurality of cells connected in series. Furthermore, to this main battery 15 is connected the 12-volt auxiliary battery 19 through the DC—DC converter 18. This auxiliary battery 19 drives various auxiliary equipment.

The DC—DC converter 18 which is controlled by the management ECU 26 charges the auxiliary battery 19 by stepping-down the terminal voltage of the main battery 15, or by stepping-down the voltage produced by the power generation of the respective motor generators 12 and 14 in the respective power drive units 16 and 17.

The respective power drive units 16 and 17 and the DC—DC converter 18 are connected in parallel with respect to the main battery 15.

The battery ECU 21 not only protects the main battery 15, but also calculates the battery state of charge SOC and calculates the amount of discharge capable of being output from the main battery 15 and the amount of charge capable of being charged to the main battery 15. Furthermore, the battery ECU 21 can determine whether or not the main battery 15 is deteriorating according to the battery state of charge SOC, the detected values for the terminal voltage, the temperature, and the history of the change in the detected values for discharge current and charge current of the main battery 15. Therefore, to the battery ECU 21 is input a detection signal output from an electrical current sensor (not shown) which detects the input and output current of the main battery 15, and a detection signal output from an electrical voltage sensor (not shown) which detects the terminal voltages of the main battery 15.

The respective motor ECUs 22 and 23 control the driving and regeneration operations of the motor generators 12 and 14 in accordance with driving and regeneration torque instructions input from the management ECU 26.

The FIECU 24 controls the operating state of the internal combustion engine 11, such as the fuel supply amount from the fuel injection valve, the ignition timing of the igniter, and the operating state of the starter motor.

The T/MECU 25 controls the speed-shifting operations of the transmission 13.

The management ECU 26 coordinatedly controls the respective operations of the battery ECU 21, the motor ECUs 22 and 23, the FIECU 24, the T/MECU 25 and the DC—DC converter.

The FIECU 24, as described later, controls the driving state of the vehicle. In particular, it controls the stopping and restarting of the idle operation of the internal combustion engine 11 according to the presence/absence of flooding into the exhaust system or the possibility thereof. Here, the FIECU 24 determines the presence/absence of flooding or the possibility of flooding, based for example on the temperature of the exhaust system.

Figure 3:
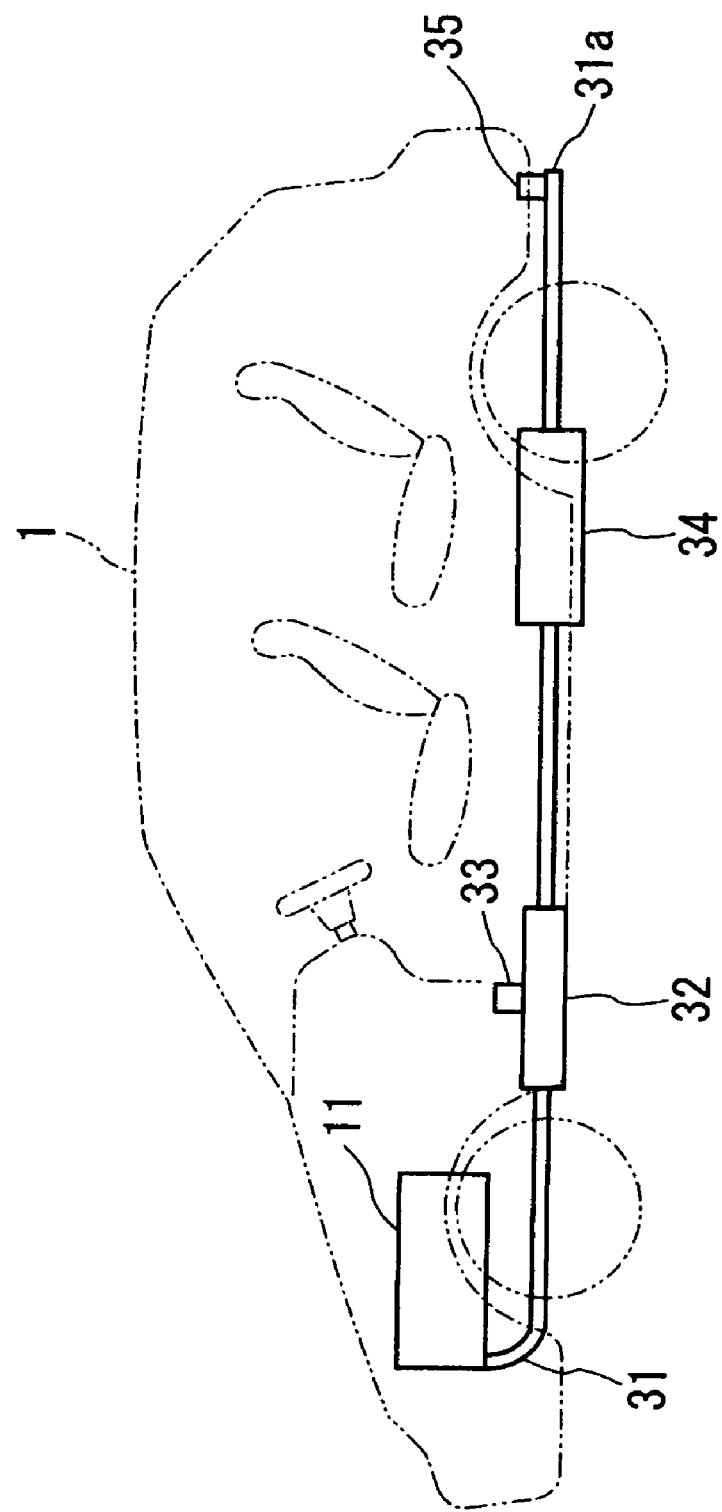
FIG. 3 is a block diagram showing an exhaust system of an internal combustion engine according to an embodiment of the present invention.

For example, as shown in FIG. 3, an exhaust pipe 31 which is connected to the respective cylinders of the internal combustion engine 11 and constitutes an exhaust manifold is furnished with an exhaust purification apparatus 32 which purifies components such as HC, CO and NOx in the exhaust gas. This exhaust purification apparatus 32 is furnished with a CAT temperature sensor 33 which detects the temperature of the catalyst (catalyst temperature TCAT), and a detection signal output from the CAT temperature sensor 33 is input to the FIECU 24.

Furthermore, the exhaust pipe 31 is equipped with a muffler 34. Downstream from the muffler 34 is located an exhaust vent 31a. Installed near this exhaust vent 31a is an exhaust vent temperature sensor 35 which detects the temperature of the exhaust vent 31a (exhaust vent temperature TEND). The detection signal output from the exhaust vent temperature sensor 35 is input to the FIECU 24.

Figure 4:
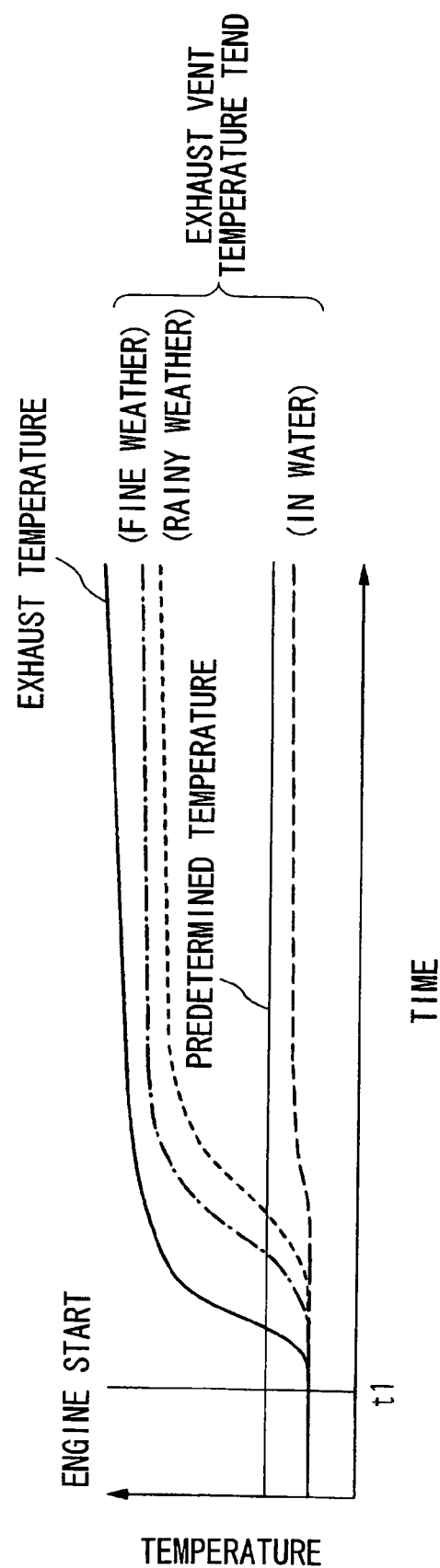
FIG. 4 is a graph showing an example of a change in exhaust gas temperature and exhaust vent temperature.

For example, as shown in FIG. 4, if the internal combustion engine 11 is in the stopped condition for more than a predetermined time, and then is started at a time t1, then after this time t1 the temperature of the exhaust gas introduced to the exhaust purification apparatus 32 (exhaust gas temperature, for example, equal to the catalyst temperature TCAT) rises with the increase in the engine temperature of the internal combustion engine 11.

For example, when driving normally in fine weather, and in a state where flooding into the exhaust vent 31a does not occur, the exhaust vent temperature TEND (fine weather) is below that of the exhaust temperature for the catalyst atmosphere.

On the other hand, when driving normally in rainy weather, the exhaust vent temperature TEND (rainy weather) is below the corresponding exhaust vent temperature in fine weather TEND (fine weather). This is due to a relatively high humidity in the atmosphere.

Furthermore, when driving in a riverbed and the exhaust vent 31a becomes flooded, then the exhaust vent temperature TEND (underwater) is below the corresponding exhaust vent temperature in rainy weather TEND (rainy weather) and also below a predetermined temperature.

Figure 5:
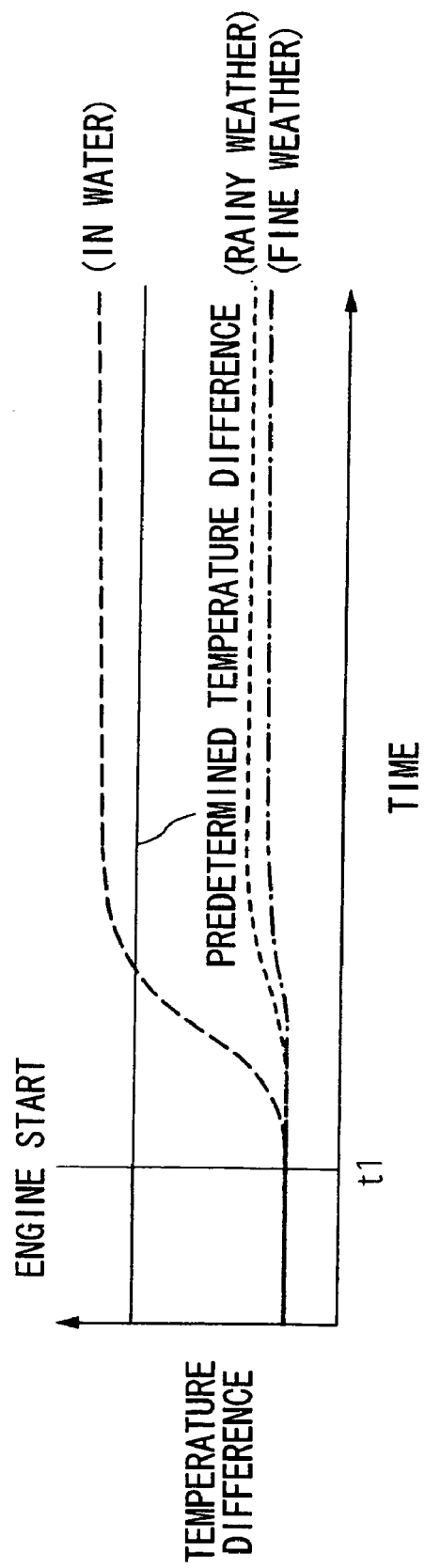
FIG. 5 is a graph showing an example of a change in temperature difference over time between exhaust gas temperature and exhaust vent temperature TEND.

Therefore, the temperature difference between the exhaust temperature and the exhaust vent temperature TEND (exhaust temperature-exhaust vent temperature TEND), as shown in FIG. 5, in a situation where flooding of the exhaust vent 31a or the periphery of the exhaust vent 31a occurs, increases over and above the predetermined temperature difference. Therefore, the FIECU 24 is able to distinguish between a state where flooding has occurred in the exhaust vent 31a or in the periphery of the exhaust vent 31a, and where flooding has not occurred in the exhaust vent 31a or in the periphery of the exhaust vent 31a (such as in fine weather and rainy weather), based on the temperature difference between different positions in the exhaust system.

Figure 6:
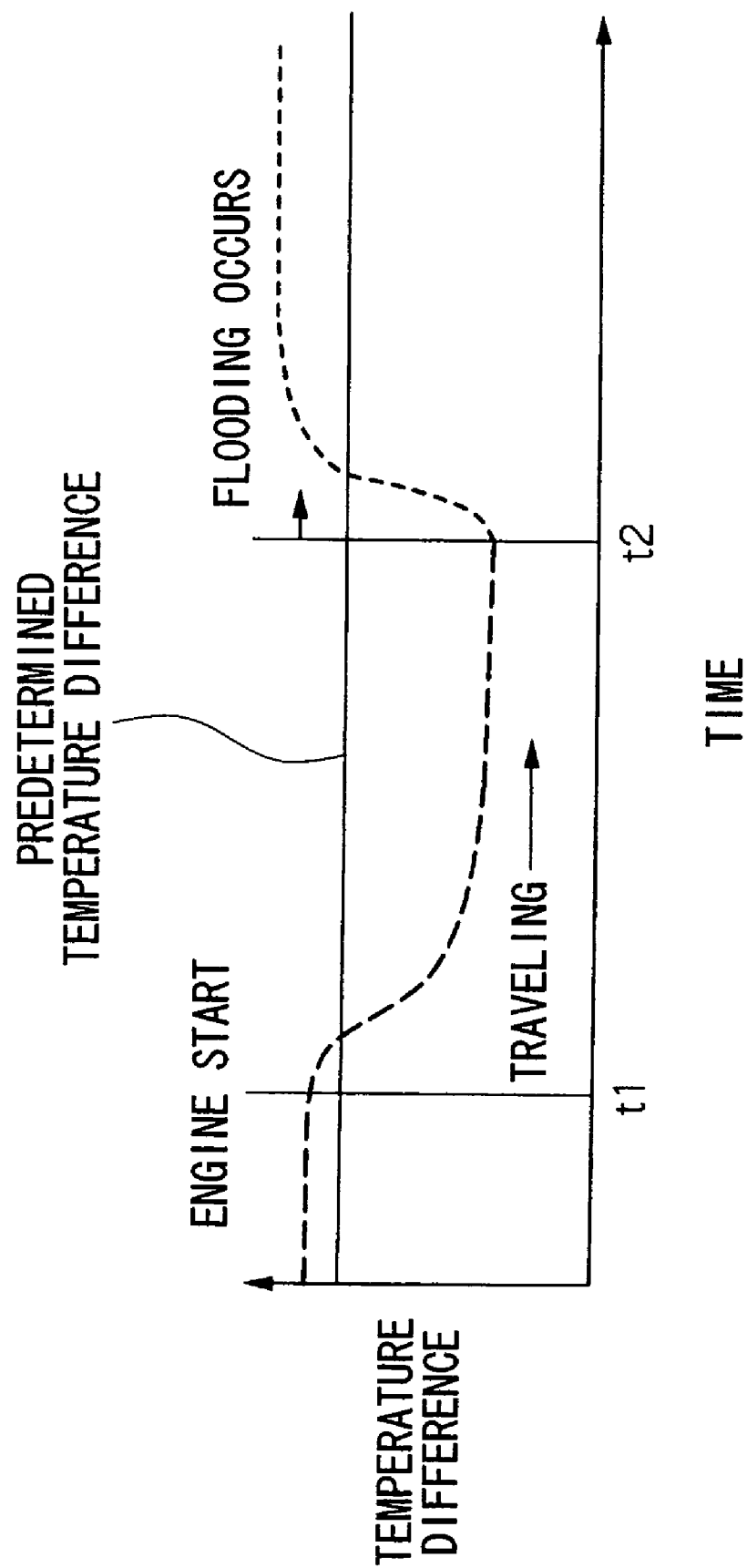
FIG. 6 is a graph showing an example of a change in temperature difference over time between exhaust gas temperature and exhaust vent temperature TEND.

Furthermore, for example, in a case where the internal combustion engine 11 is in a temporary idle stopped condition and then restarted, if the internal combustion engine 11 having a relatively high temperature is started, then as shown in FIG. 6, the temperature difference between the exhaust gas temperature of the catalyst atmosphere and the exhaust vent temperature TEND is above the predetermined temperature difference prior to starting the internal combustion engine at time t1. Then, along with starting the internal combustion engine 11, high-temperature exhaust gas flows from the exhaust purification apparatus 32 to the exhaust vent 31a. When the exhaust vent 31a and the periphery of the exhaust vent 31a are not flooded, the temperature difference between the exhaust gas temperature of the catalyst atmosphere and the exhaust vent temperature TEND declines below the predetermined temperature difference.

In this state, when driving in a riverbed and flooding of the exhaust vent 31a or periphery of the exhaust vent 31a occurs from time t2 onwards, the exhaust vent 31a becomes cooled, resulting in an increase in the temperature difference between the exhaust gas temperature of the catalyst atmosphere and the exhaust vent temperature TEND, to above the predetermined temperature difference.

Therefore, based on the time-varying temperature difference between different positions in the exhaust system, the FIECU 24 is able to determine the presence/absence of flooding into the exhaust system, and whether there is a possibility of flooding of the exhaust system or not.

If the FIECU 24 determines that flooding has occurred in the exhaust system, or there is a possibility of flooding into the exhaust system, execution of the idle stopping of the internal combustion engine 11 in a driving condition is prohibited, or the internal combustion engine 11 in an idle stopped condition is restarted, so as to prevent water from entering the exhaust system from the outside of the vehicle.

Moreover, when the FIECU 24 determines that flooding has occurred in the exhaust system, or there is a possibility of flooding into the exhaust system, execution of the operation to drive the vehicle solely under the driving force from the respective motor generators 12 and 14 is prohibited. Alternatively, the state may be switched from the state where the vehicle is driven solely under the driving force from the respective motor generators 12 and 14, to the state where the vehicle is driven under the driving force from the internal combustion engine 11.

At this point, the FIECU 24 increases the target engine speed for the idle operation of the internal combustion engine 11 by a predetermined speed, and increases the amount of exhaust gas, so as to prevent water from entering the exhaust system from the outside of the vehicle even further.

The control apparatus for automatic starting/stopping an internal combustion engine 10 according to the present embodiment includes the above construction. Next is a description with reference to the appended drawings, of an operation of this control apparatus for automatic starting/stopping an internal combustion engine 10, in particular, processing for; determining the presence/absence of flooding into the exhaust system or the possibility thereof, based on the catalyst temperature TCAT output from the CAT temperature sensor 33, and the exhaust vent temperature TEND output from the exhaust vent temperature sensor 35, and determining whether it is possible to execute idle stopping of the internal combustion engine 11 or not according to the above determination, and whether it is possible to execute restarting of the internal combustion engine from an idle stopped condition.

Figure 7:
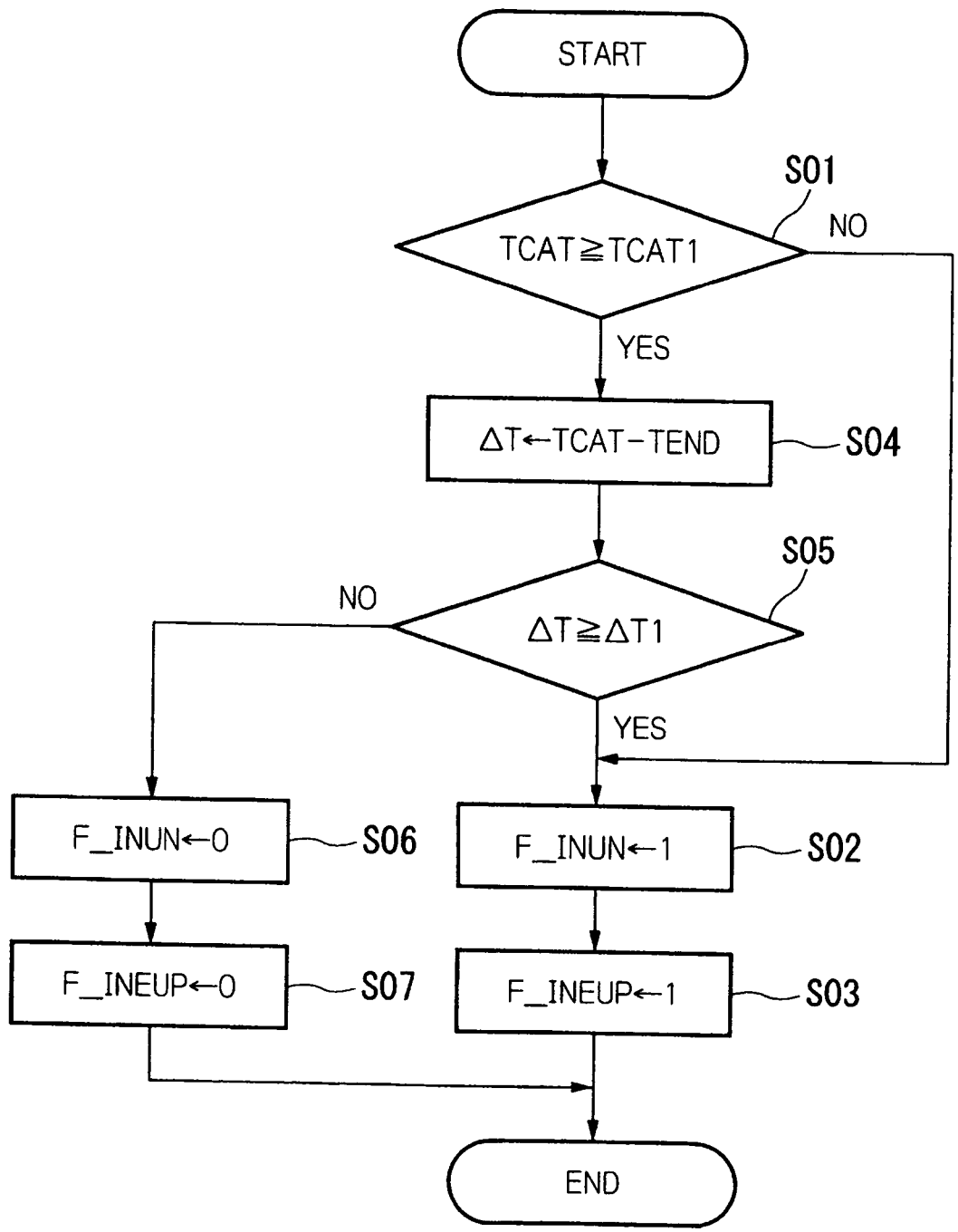
FIG. 7 is a flow chart showing processing for determining whether or not there is a possibility of flooding occurring into in an internal combustion engine.

Hereunder is a description of the processing for determining whether or not there is a possibility of flooding occurring into the internal combustion engine 11, with reference to FIG. 7. This processing is executed in the FIECU 24, being invoked at predetermined time intervals, for example every 10 msec, by a main routine (not shown).

First, in step S01 shown in FIG. 7, it is determined whether the catalyst temperature TCAT detected by the CAT temperature sensor 33 which is installed in the exhaust purification apparatus 32 and measures the temperature (TCAT) of the catalyst (CAT), is above a predetermined temperature TCAT1, or not.

When the determination is "YES", the flow proceeds to step S04 described later.

On the other hand, when the determination is "NO", the flow proceeds to step S02 and the flag value of a flooding determination flag F_INUN is set to "1". Subsequently the flow proceeds to step S03, where the flag value of an idle rotation speed increase flag F_INEUP which indicates that the target engine speed in the idle operating state of the internal combustion engine 11 is increased by a predetermined rotation speed, is set to "1". Once set, the series of processing is finished.

In step S04, the temperature of the exhaust vent (TEND) of the exhaust system of the internal combustion engine 11 is detected by the exhaust vent temperature sensor 35, and the value obtained by subtracting the catalyst temperature TCAT from the exhaust vent temperature TEND is set to the temperature difference ΔT.

Next, in step S05, it is determined whether the temperature difference ΔT is above a predetermined temperature difference ΔT1, or not.

When the determination of step S05 is "YES", the flow proceeds to step S02 described above.

On the other hand, when the determination of step S05 is "NO", the flow proceeds to step S06.

In step S06, the flag value of a flooding determination flag F_INUN is set to "0", and the flow proceeds to step S07. In step S07, the flag value of the idle rotation speed increase flag F_INEUP is set to "0", and the series of processing is finished.

Figure 8:
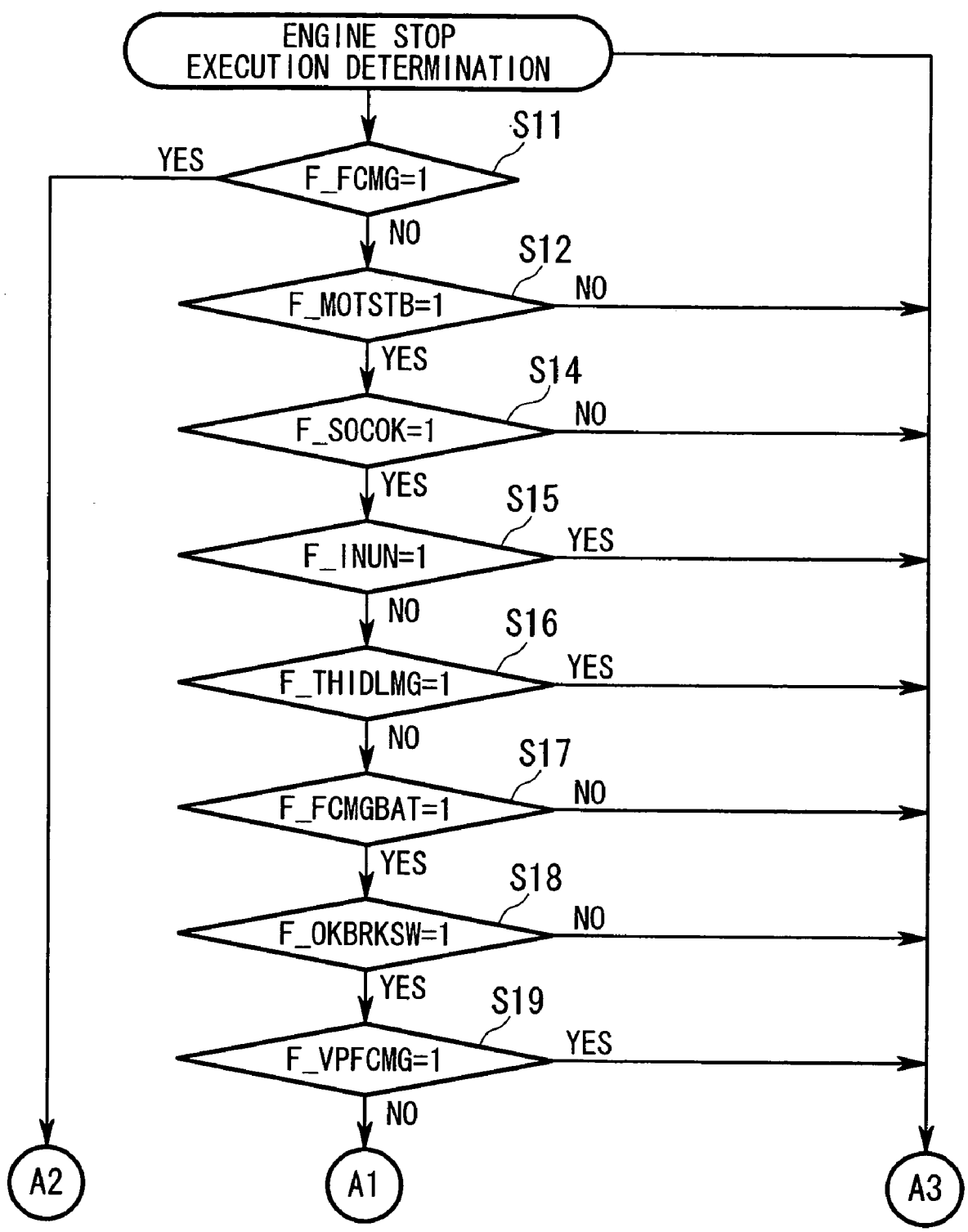
FIG. 8 is a flow chart showing processing for determining whether or not idle stop should be executed.
Figure 9:
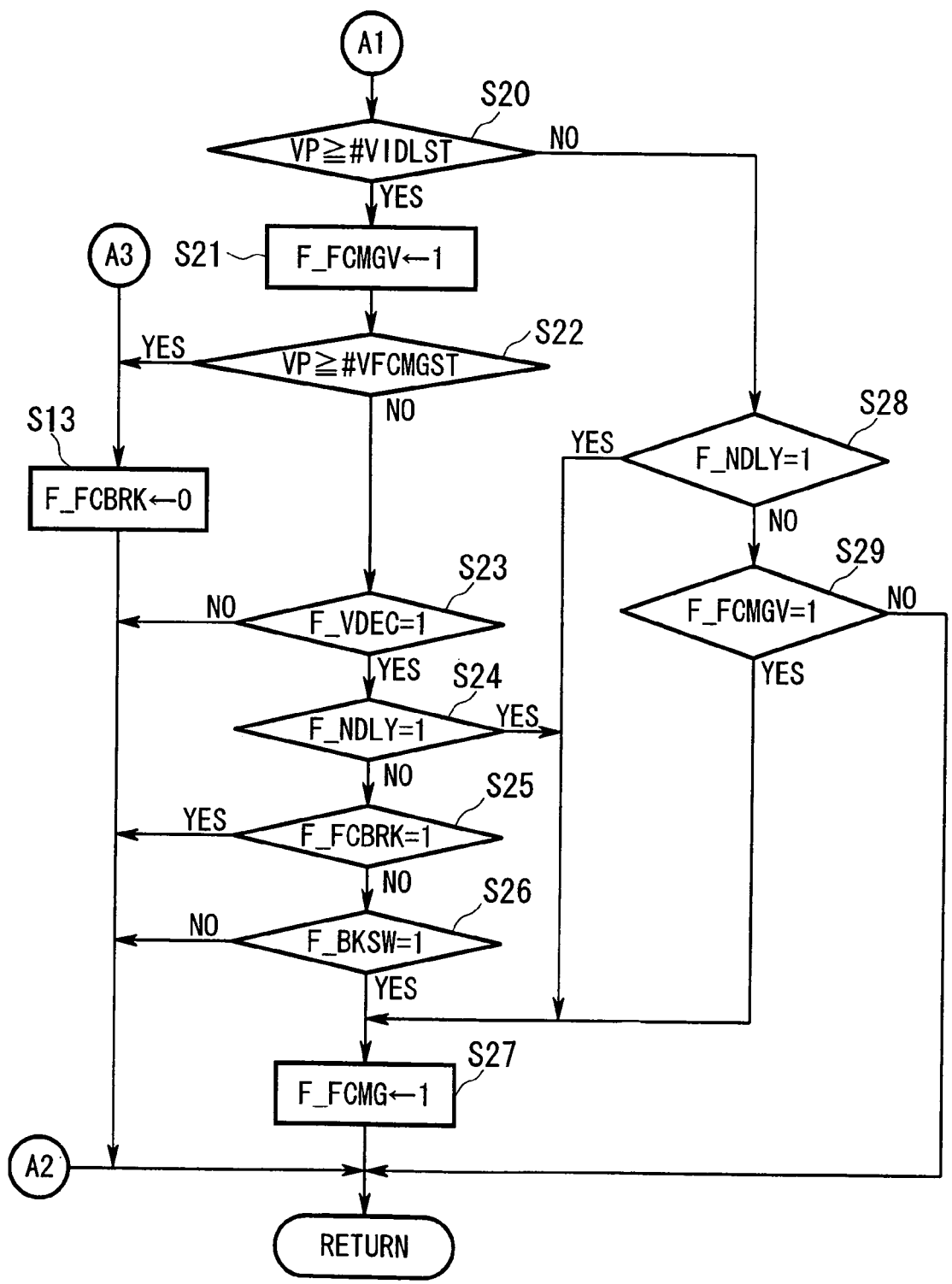
FIG. 9 is a flow chart showing processing for determining whether or not idle stop should be executed.

Hereunder is a description of the processing which determines whether idle stop should be executed or not, with reference to FIG. 8 and FIG. 9. This processing is executed in the FIECU 24 by being invoked at predetermined time intervals, for example 10 msec, by a main routine (not shown). Whether the idle stop will be executed or not is determined by the flag value of an idle stop execution determination flag F_FCMG When the value of the idle stop execution determination flag F_FCMG is "1", then when returning to the main routine, idle stop control is executed. When the value of the idle stop execution determination flag F_FCMG is "0", idle stop control is not executed.

Firstly, in step S11 shown in FIG. 8, it is determined whether the value of the idle stop execution determination flag F_FCMG is "1" or not.

When the determination is "YES", then the series of processing is finished.

On the other hand, when the determination is "NO", then the flow proceeds to step S12.

In step S12, it is determined whether the flag value of a flag F_MOTSTB which indicates that it is possible to start the internal combustion engine 11 by the driving force of the front motor generator 12, is "1" or not.

When the determination is "NO", the flow proceeds to step S13, shown in FIG. 9. In step S13, the flag value of a flag F_FCBRK, which indicates the brakes are in the OFF state in a fuel supply cancellation state for when the vehicle is travelling to decelerate, is set to "0", and the series of processing is finished.

On the other hand, when the determination is "YES", then the flow proceeds to step S14.

In step S14, it is determined whether the value of a flag F_SOCOK, which indicates the state of charge of the main battery 15 is above a predetermined state of charge, is "1" or not.

When the determination of step S14 is "NO", that is the state of charge of the main battery 15 is below the predetermined state of charge, then the flow proceeds to step S13 described above.

On the other hand, when the determination of step S14 is "YES", that is, the state of charge of the main battery 15 is above the predetermined state of charge, the flow proceeds to step S15.

In step S15, it is determined whether the flag value of a flooding determination flag F_INUN is "1" or not.

When the determination is "NO", that is there is no possibility of flooding into the internal combustion engine 11, the flow proceeds to step S13 described above.

On the other hand, when the determination is YES, that is there is a possibility of flooding into the internal combustion engine 11, the flow proceeds to step S16.

In step S16, it is determined whether the flag value of an IDLE determination flag F_THIDLMG is "1" or not.

When the determination is "YES", that is the operation amount of the accelerator pedal by the driver is not completely closed, the flow proceeds to step S13 described above.

On the other hand, when the determination is "NO", that is the operation amount of the accelerator pedal by the driver is completely closed, the flow proceeds to step S117.

In step S17, it is determined whether the flag value of an idle stop execution determination flag F_FCMGBAT which indicates that the state of charge of the main battery 15 is above a predetermined minimum state of charge which allows the execution of idle stop, is set to "1" or not. The setting is such that the predetermined minimum state of charge which allows the execution of idle stop changes according to, for example, the power consumption in the vehicle.

When the determination is "YES", that is the main battery 15 is charged to an extent which allows the execution of idle stop, the flow proceeds to step S13 described above.

On the other hand, when the determination is "NO", that is the main battery 15 is not charged to an extent which allows the execution of idle stop, the flow proceeds to step S18.

In step S18, it is determined whether the flag value of a flag F_OKBRKSW, which indicates that an on (for example the brake pedal has been depressed by the driver)/off state of the brake pedal has been detected, is set to "1" or not. This flag value is set based on, for example, engine speed, vehicle speed, shift position, and the like.

When the determination is "NO", the flow proceeds to step S13 described above.

On the other hand, when all the determinations are "YES", the flow proceeds to step S19.

In step S19, it is determined whether the flag value of a flag F_VPFCMQ which indicates an abnormality in pulses output from a pulse generator at predetermined periods, is "1" or not. The pulse generator is provided on the wheels (front wheels Wf and rear wheels Wr) to detect the vehicle speed based on the wheel speed.

When the determination of step S19 is "YES", the flow proceeds to step S13 described above.

On the other hand, when the determination of step S19 is "NO", then the flow proceeds to step S20 shown in FIG. 9.

In step S20 shown in FIG. 9, it is determined whether the vehicle speed VP is above a predetermined vehicle speed #VIDLST (for example, 3 km/h) or not.

When the determination is "NO", the flow proceeds to step S28 described later.

On the other hand, when the determination is "YES", that is the vehicle speed VP is above the predetermined vehicle speed #VIDLIST, then it is determined that the vehicle has begun moving, and the flow proceeds to step S21. In step S21, the value of an idle stop execution determination flag F_FCMGV according to the vehicle speed VP is set to "1".

The flag value of the idle stop execution determination flag F_FCMGV becomes "1" when the vehicle speed VP increases above the predetermined vehicle speed, and indicates the vehicle has begun moving. Moreover in a restart frequency CNTL is stored a discrete value, for example the number of times an in-gear state has been reached.

Next, in step S22, it is determined whether the vehicle speed VP is above a predetermined vehicle speed #VFC-MGST (for example, 30 km/h) or not.

When the determination is "YES", the flow proceeds to step S113 described above.

On the other hand, when the determination is "NO", the flow proceeds to step S23.

In step S23, it is determined whether the flag value of a flag F_VDEC, which indicates that the driving state of the vehicle is in a deceleration state, is "1" or not. The flag value of the flag F_VDEC is "1" in the case where the degree of deceleration of the vehicle is above a predetermined value (for example, 0.05 G).

When the determination of step S23 is "NO", the series of processing is finished.

On the other hand, when the determination is "YES", the flow proceeds to step S24.

In step S24, it is determined whether the flag value of a flag F_NDLY, which indicates the deviation in vehicle speed VP is above a predetermined value, is "1" or not.

When the determination is "YES", the flow proceeds to step S27 described later.

On the other hand, when the determination is "NO", the flow proceeds to step S25.

The processing of step S25 and step S26 is executed serially. In step S25, it is determined whether the flag value of a flag F_FCBRK, which indicates that the deceleration F/C for canceling the fuel supply is still running in the deceleration state of the vehicle, is "1" or not. In step S26, it is determined whether the flag value of a flag F_BKSW, which indicates that the brake is being operated by the driver, is "1" or not.

When the determination of step S25 is "YES", or the determination of step S26 is "NO", the series of processing is finished.

On the other hand, when the determination of step S25 is "NO", and the determination of step S26 is "YES", the flow proceeds to step S27.

In step S27, the flag value of an idle stop execution determination flag F_FCMG is set to "1", and the series of processing is finished.

Moreover, in step S28, it is determined whether the flag value of a flag F_NDLY, which indicates that the shift position has been in neutral for more than a predetermined time period, is "1" or not.

When the determination is "YES", the flow proceeds to step S27 described above.

On the other hand, when the determination is "NO", the flow proceeds to step S29.

In step S29, it is determined whether the flag value of the idle stop execution determination flag F_FCMGV according to the vehicle speed VP is "1" or not.

When the determination is "NO", the series of processing is finished.

On the other hand, when the determination is "YES", the flow proceeds to step S27 described above.

Figure 10:
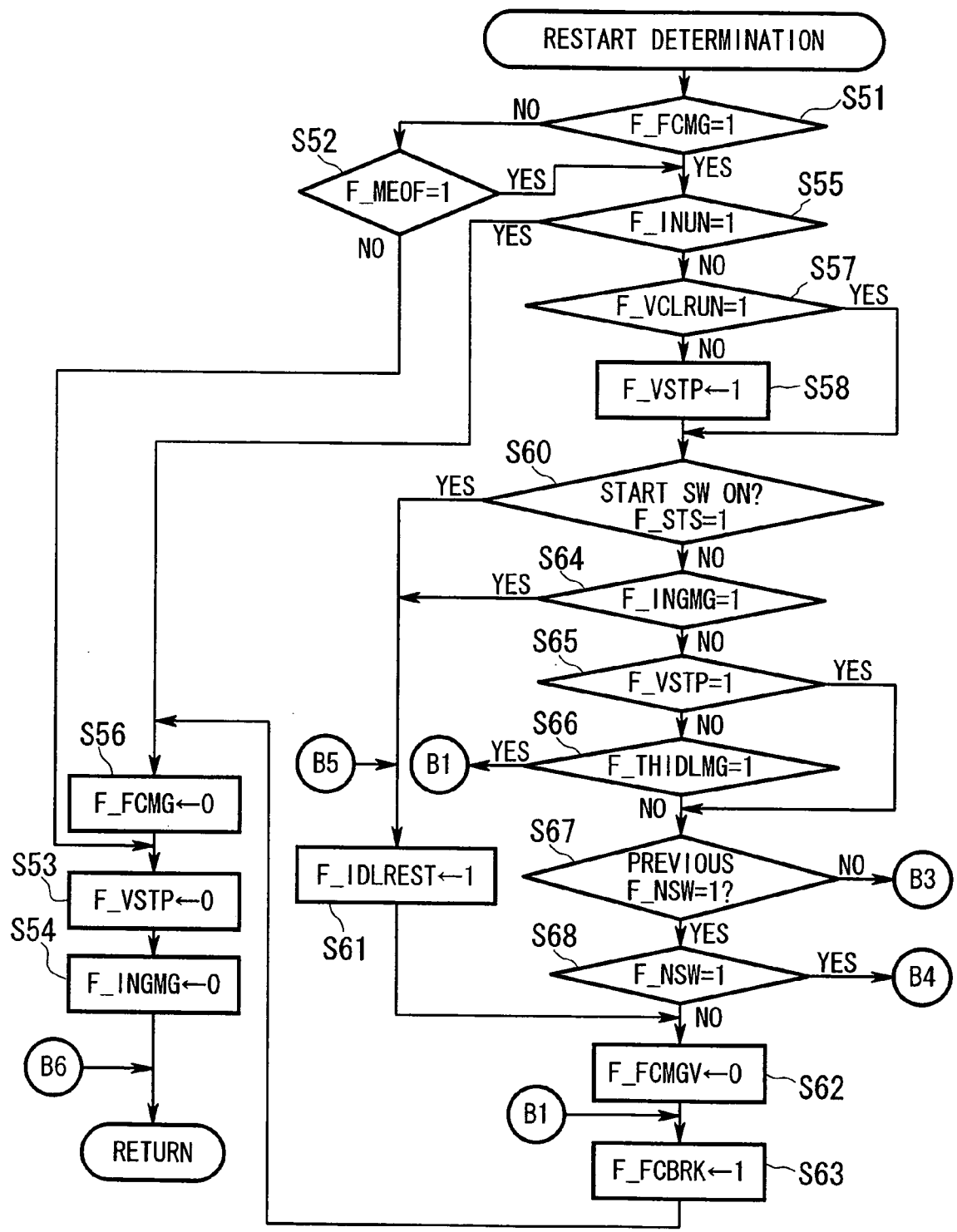
FIG. 10 is a flow chart showing processing for determining whether the internal combustion engine should be restarted or not.
Figure 11:
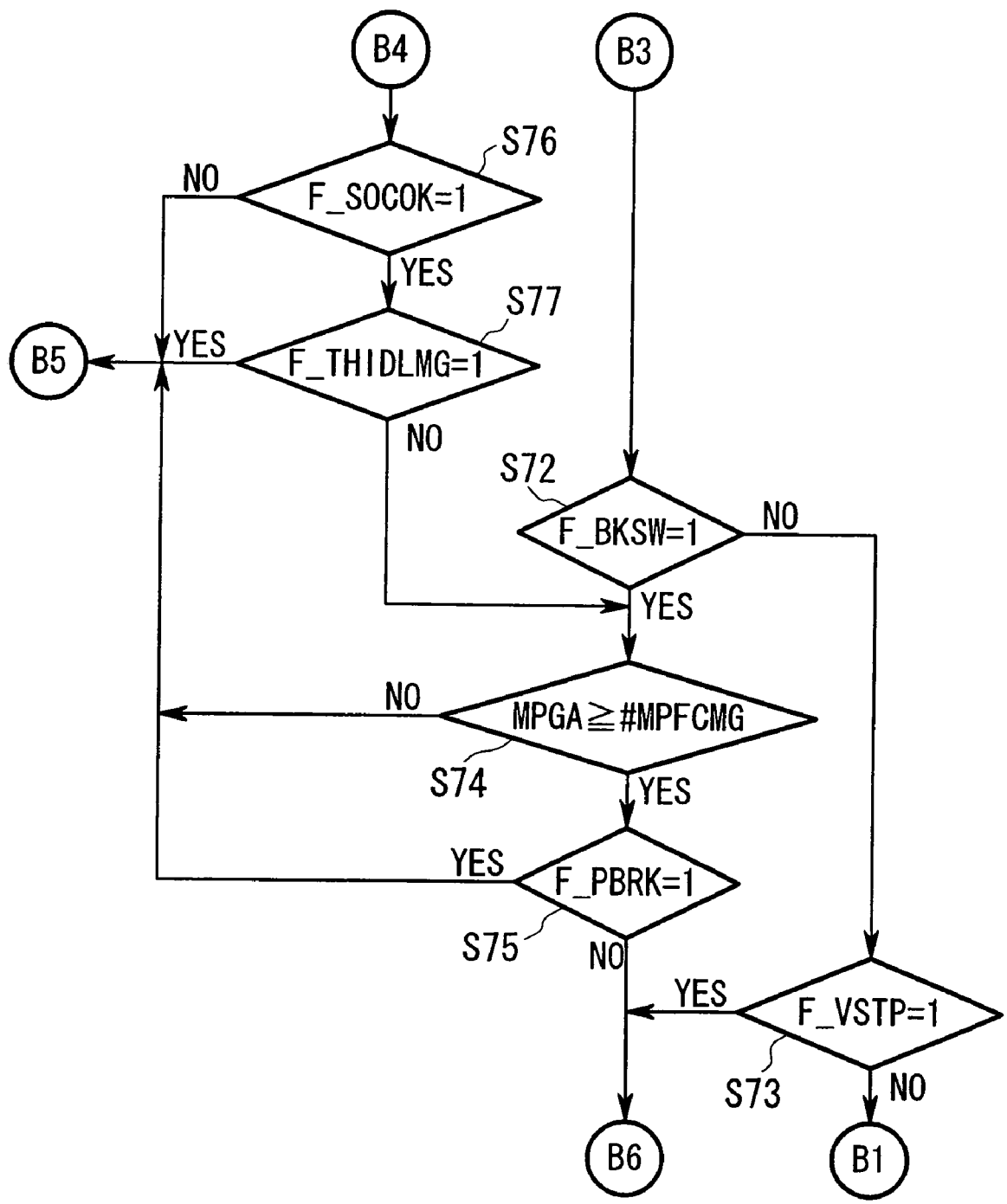
FIG. 11 is a flow chart showing processing for determining whether the internal combustion engine should be restarted or not.

Hereunder is a description of the processing involved in determining whether or not the restarting of the internal combustion engine 11 should be executed when the idle stopped condition is running, with reference to FIG. 10 and FIG. 11. This processing is executed in the FIECU 24 by being invoked at predetermined time intervals, for example 10 msec, by a main routine (not shown).

Whether the internal combustion engine 11 should be restarted or not is dependant on whether the idle stop execution determination flag F_FCMG will be set to "0" or not. That is, when the flag value of the idle stop determination flag F_FCMG is "0", then after returning to the main routine, the restarting control of the internal combustion engine 11 is executed, while when the flag value is "1" this is not executed.

Firstly, in step S51 shown in FIG. 10, it is determined whether the flag value of the idle stop determination flag F_FCMG is "1" or not.

When the determination is "YES", the flow proceeds to step S55 described later.

When the determination is "NO", the flow proceeds to step S52.

In step S52, it is determined whether the flag value of a flag F_MEOF, which indicates that the internal combustion engine 11 is in a stalled state, that is, the engine speed NE is zero, is "1" or not.

When the determination of step S52 is "YES", that is, the engine speed NE has become zero in a state where execution of idle stop is prohibited, such as when the vehicle is stopped in an in-gear state, the flow proceeds to step S55 described later.

On the other hand, when the determination of step S52 is "NO", then the flow proceeds to step S53.

In step S53, the flag value of a flag F_VSTP, which indicates the vehicle has stopped, is set to "0", and the flow proceeds to step S54.

In step S54, the flag value of a flag F_INGMG, which indicates the clutch has been set into an engaged state while the shift position is neutral, and an in-gear operation has been executed, is set to "0", and the series of processing is finished.

In step S55, it is determined whether the flag value of a flooding determination flag F_INUN is "1" or not.

When the determination is "NO", that is, there is no possibility of flooding occurring into the internal combustion engine 11, the flow proceeds to step S57 described later.

On the other hand, when the determination is "YES", that is, there is a possibility of flooding occurring into the internal combustion engine 11, the flow proceeds to step S56.

In step S56, the flag value of the idle stop execution determination flag F_FCMG is set to "0", and the flow proceeds to step S53 described above.

Moreover, in step S57, it is determined whether the flag value of a flag F_VCLRUN, which indicates that the wheels are rotating, is "1" or not.

When the determination of step S57 is "YES", the flow proceeds to step S60 described later.

On the other hand, when the determination in step S57 is "NO", the flow proceeds to step S58. In step S58 the flag value of a flag F_VSTP, which indicates that the vehicle has stopped, is set to "1". The flow then proceeds to step S60. By referring to the flag value of the flag F_VSTP, it is possible to determine when the vehicle has stopped in the past, and also the number of times the vehicle has stopped.

In step S60, it is determined whether the flag value of a flag F_STS, which indicates that the starter switch is in the on state, is "1" or not.

When the determination of step S60 is "YES", the flow proceeds to step S61. In step S61, the flag value of a flag F_IDLREST, which indicates that the execution of idle stop is prohibited when the vehicle is stopped, is set to "1". The flow then proceeds to step S62, where the flag value of the idle stop execution determination flag F_FCMGV according to the vehicle speed VP is set to "0". The flow then proceeds to step S63, where the flag value of a flag F_FCBRK, which indicates that the deceleration F/C is running, is set to "1". The flow then proceeds to step S56 described above.

On the other hand, when the determination of step S60 is "NO", the flow proceeds to step S64. In step S64, it is determined whether the flag value of a flag F_INGMG which indicates that the in-gear state is reached while the clutch is engaged, is "1" or not.

When the determination of step S64 is "YES", it is recognized that the driver has put the gear shift into the in-gear state after depressing the clutch with the intention of restarting the internal combustion engine 11. Even in reality if due to rapid operator action the driver has put the gear shift into the in-gear state before depressing the clutch pedal, then in order to restart the internal combustion engine 11 in case the clutch pedal is depressed once more, the flow proceeds to step S61 described above.

On the other hand, when the determination of step S64 is "NO", the flow proceeds to step S65.

In step S65, it is determined whether the flag value of a flag F_VSTP, which indicates that the vehicle is stopped, is "1" or not.

When the determination is "YES", the flow proceeds to step S67.

On the other hand, when the determination is "NO", that is, the clutch pedal is depressed and there is no history of the vehicle having stopped, and the vehicle is coasting, the flow proceeds to step S66, where it is determined whether the flag value of the IDLE determination flag F_THIDLMG is "1" or not.

When the determination of step S66 is "YES", that is, the operation amount of the accelerator pedal by the driver is not fully closed, the flow proceeds to step S63 described above. This means when the clutch pedal is depressed while coasting, and the accelerator pedal is depressed, the engine is restarted.

On the other hand, when the determination is "NO", that is, the operation amount of the accelerator pedal by the driver is fully closed, the flow proceeds to step S67.

In step S67, it is determined whether the flag value of a flag F_NSW, which indicates the shift position is in neutral, was "1" the last time it was processed or not.

When the determination is "NO", the flow proceeds to step S72 described later.

On the other hand, when the determination is "YES", the flow proceeds to step S68 and it is determined whether the flag value of the flag F_NSW is "1" this time around or not.

When the determination of step S68 is "YES", the flow proceeds to step S76 described later.

On the other hand, when the determination of step S68 is "NO", that is, the clutch pedal is depressed and a gear change has been executed, the flow proceeds to step S62.

In step S72 shown in FIG. 11, it is determined whether the flag value of a flag F_BKSW, which indicates that the brakes are currently being operated by the driver, is "1" or not.

When the determination of step S72 is "YES", the flow proceeds to step S74 described later.

On the other hand, when the determination of step S72 is "NO", the flow proceeds to step S73, where it is determined whether the flag value of a flag F_VSTP, which indicates that the vehicle has stopped, is "1" or not.

When the determination of step S73 is "YES", the series of processing is finished.

On the other hand, when the determination of step S73 is "NO", that is, the driver is not depressing the clutch pedal (clutch is in the engaged state), the shift position is in neutral, the driver is not depressing the brake pedal (brake OFF state), and there is no history of the vehicle having stopped, it is determined that the driver has the intention of coasting and that the intent of vehicle stoppage is unknown (including a situation where there is no intent of vehicle stoppage). Subsequently, in order to restart the internal combustion engine 11 to prepare for a driving operation such as an acceleration operation, the flow proceeds to step S63 described above.

In step S74, it is determined whether a brake master power negative pressure MPGA of the booster linked to the brake pedal is above a predetermined value #MPFCMG or not.

When the determination is "NO", that is, when the brake master power negative pressure MPGA has decreased and the response of the brake pedal is stronger, then it is determined that there is a possibility that the driver may have difficulty putting the brakes into effect. To restart the internal combustion engine 11 so as to ensure a desired negative pressure, the flow returns to step S61 described above.

On the other hand, when the determination is "YES", the flow proceeds to step S75.

In step S75, it is determined whether the flag value of a flag F_PBRK, which indicates the number of times the brake pedal has been switched on and off is above a predetermined number so that brake pumping has been executed, is "1" or not.

When the determination of step S75 is "YES", that is the driver uses brake pumping often so that it is determined that there is a possibility that the brake master power negative pressure MPGA may overly decrease, then to restart the internal combustion engine 11 so as to ensure a desired negative pressure, the flow proceeds to step S61 described above.

On the other hand, when the determination of step S75 is "NO", the series of processing is finished.

In step S76, it is determined whether the flag value of a flag F_SOCOK, which indicates the state of charge of the main battery 15 is above a predetermined state of charge, is "1" or not.

When the determination of step S76 is "NO", that is, in the previous processing cycle and this processing cycle the shift position is in neutral, and the state of charge of the main battery 15 is below the predetermined state of charge, the flow proceeds to step S61 described above.

On the other hand, when the determination of step S76 is "YES", that is, the state of charge of the main battery 15 is above the predetermined state of charge, the flow proceeds to step S77.

In step S77, it is determined whether the flag value of the IDLE determination flag F_THIDLMG is "1" or not.

When the determination of step S77 is "YES", that is, the operation amount of the accelerator pedal by the driver is not fully closed, the flow returns to step S61 described above.

On the other hand, when the determination of step S77 is "NO", that is, the operation amount of the accelerator pedal by the driver is fully closed, the flow proceeds to step S74 described above.

As mentioned above, according to the control apparatus for automatic starting/stopping an internal combustion engine 10 according to the present embodiment, if it is determined that there is a possibility of flooding into the exhaust system of the internal combustion engine 11, then by prohibiting automatic stopping of the internal combustion engine 11 while in an operating state, it is possible to maintain the desired exhaust pressure of the internal combustion engine 11 and prevent water from entering the exhaust system equipped with an exhaust purification apparatus 32 and the like. Furthermore, by prohibiting the execution of the operation to drive the vehicle solely under the driving force from the respective motor generators 12 and 14, it is possible to continue operating the internal combustion engine 11 in the driving state of the vehicle and maintain the desired exhaust pressure.

In addition, by automatically starting the internal combustion engine 11 before the exhaust system of the internal combustion engine 11 actually becomes flooded, it is possible to maintain the desired exhaust pressure of the internal combustion engine 11, and prevent water from entering the exhaust system equipped with an exhaust purification apparatus 32 and the like. Furthermore, by switching from a state where the vehicle is running solely under the driving force from the respective motor generators 12 and 14, to the state where the vehicle is running under the driving force from the internal combustion engine 11, it is possible to maintain the desired exhaust pressure in the internal combustion engine 11 while maintaining the desired driving force in the driving state of the vehicle.

In the present embodiment, the FIECU 24 determines the presence/absence of flooding of the exhaust system, or whether there is a possibility of flooding occurring into the exhaust system or not, based on the change in the temperature difference over time between different positions in the exhaust system. However, the determination is not limited to this, and for example a liquid level detection apparatus may be installed near the exhaust vent 31a of the exhaust pipe 31, and the presence/absence of flooding into the exhaust system, or whether there is a possibility of flooding occurring into the exhaust system or not, may be determined according to a detection signal output from the liquid level detection apparatus.

It is possible to use various liquid level detection apparatus, for example float type, optical type, and conductive type liquid level detection apparatus.

Figure 12:
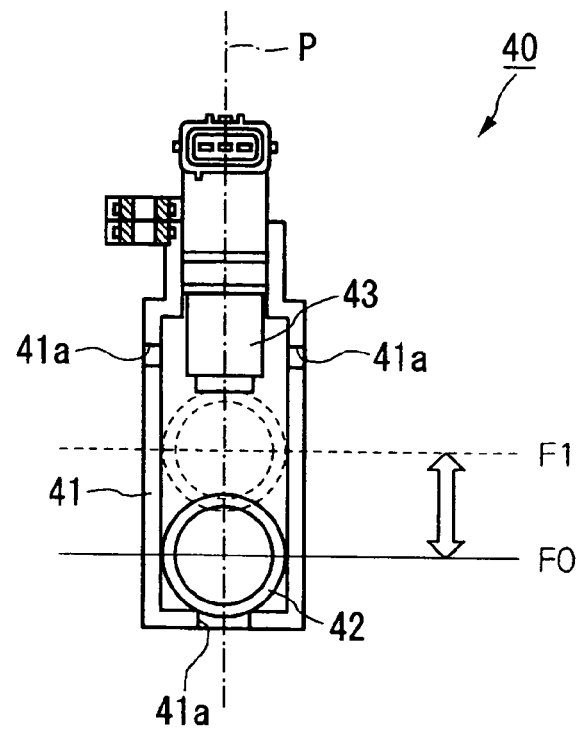
FIG. 12 is a block diagram showing a float-type liquid level detection apparatus according to a modified example of the present embodiment.

For example, a float type liquid level detection apparatus 40 shown in FIG. 12 includes: a float switch; a cylindrical float guide 41; a spherical float 42 which is movably accommodated along a central axis P inside the float guide 41; and a lead switch 43 which is arranged at one end inside the float guide 41 on the central axis P. The float guide 41 has a plurality of openings 41a, which introduce the liquid for detection to the interior, and discharge the liquid to the exterior. Inside the float 42 is installed a permanent magnet (not shown).

The float type liquid level detection apparatus 40 shown in FIG. 12 is set such that the central axis P is parallel to the vertical direction, with the end with the lead switch 43 positioned vertically above the other end. For example, when the level of the liquid for detection gradually rises in the vertical direction and enters the float guide 41, the float 42 rises in the vertical direction from its initial position F0 to an upper limit position F1. This results for example, in the contact points of the lead switch 43 which are set to be open (OFF state) under normal circumstances becoming closed (ON state) due to excitation from the permanent magnet installed in the float 42.

Figure 13:
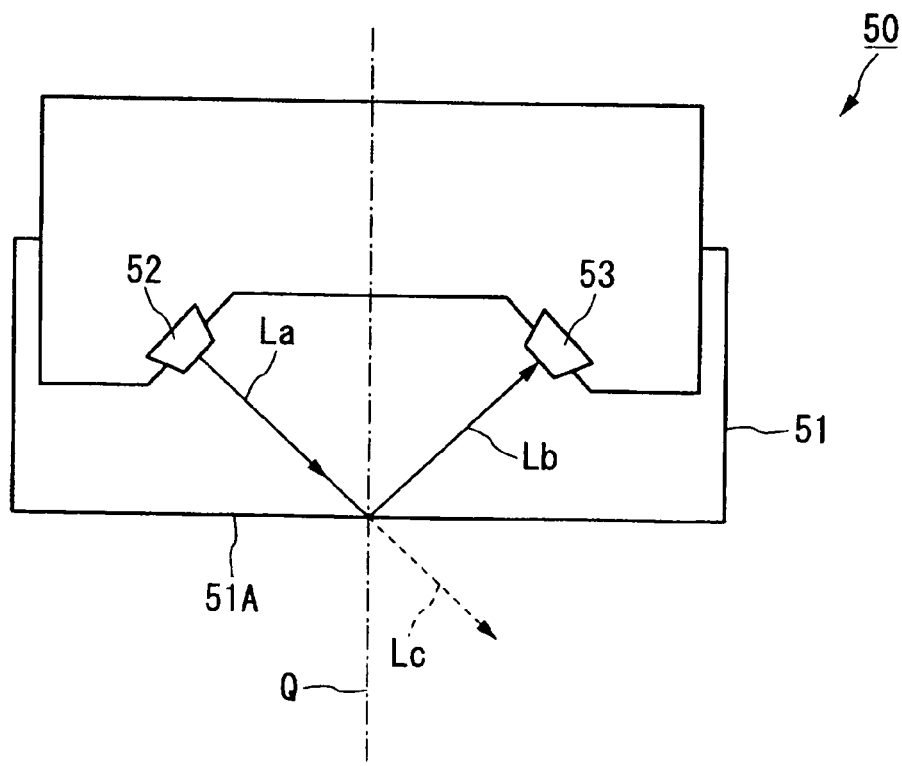
FIG. 13 is a block diagram showing an optical-type liquid level detection apparatus according to a modified example of the present embodiment.

Moreover, an optical type liquid level detection apparatus 50 shown in FIG. 13 includes for example; a light transmitting material 51 composed of an optically transparent material such as a light transmitting resin, and a light emitting element 52 including for example a light emitting diode, and a photodetector 53 including for example a photodiode, arranged inside the light transmitting material 51. The construction is such that the light emitting element 52 is arranged so that a light beam La irradiated from the light emitting element 52 towards the outer surface 51A of the light transmitting material 51, is totally reflected on the outer surface 51A of the light transmitting material 51 which is exposed for example to the atmosphere, and a reflected light beam Lb due to this total reflection is transmitted through the light transmitting material 51 and reaches the photodetector 53.

Then, for example as shown in FIG. 13, the optical type liquid level detection apparatus 50 is arranged such that the orthogonal axis Q of the outer surface 51A of the light transmitting material 51 is parallel to the vertical direction. In this condition, in the case where the level of the liquid for detection gradually rises in the vertical direction so that the outer surface 51A of the light transmitting material 51 becomes immersed in the liquid, the refractive index is decreased, so that total reflection is no longer achieved, and the light beam La is transmitted through the liquid as a transmitted light beam Lc. Accordingly, compared to the normal state when the outer surface 51A of the light transmitting material 51 is exposed to the atmosphere (OFF state), the quantity of received light detected at the photodetector 53 when the outer surface 51A of the light transmitting material 51 is immersed in liquid (ON state) is lower.

Figure 14:
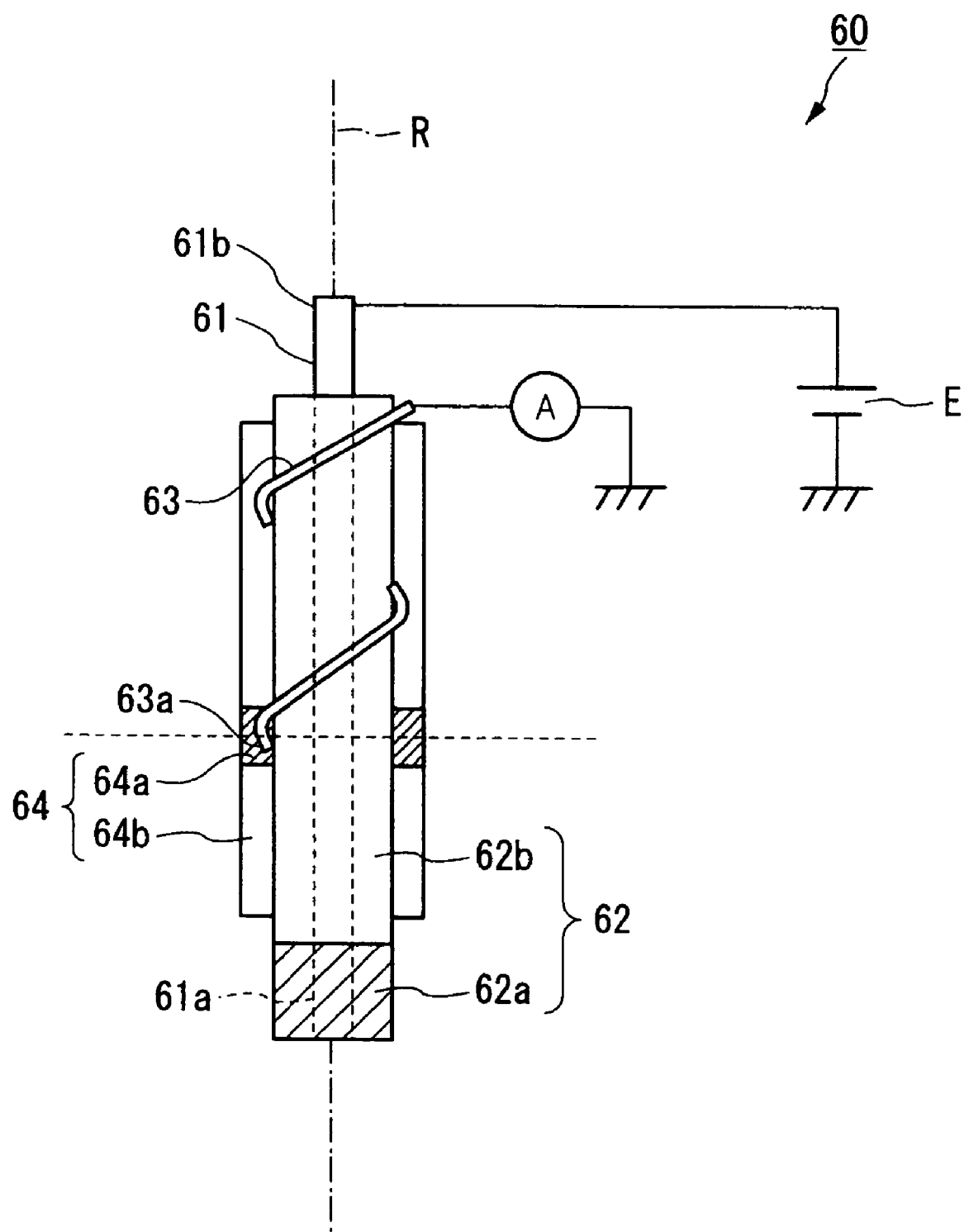
FIG. 14 is a block diagram showing a conductive-type liquid level detection apparatus according to a modified example of present embodiment.

Moreover, a conduction type liquid level detection apparatus 60 shown in FIG. 14 includes for example: a core wire 61 composed of conductors connected to a power source E; a first coating 62 which covers the core wire 61; a shield wire 63 composed of an earthed wire, helically wound on the outer peripheral surface of the first coating 62 along a direction R in which the core wire 61 extends, up to a predetermined position; and a second coating 64 which covers the outer peripheral surface of the first coating 62 wound on the shield wire 63.

The first coating 62 includes a conductive part 62a composed of a conductive fluororesin which covers one end 61a of the core wire 61, and an insulator 62b composed of an insulative fluororesin which covers all of the core wire 61 other than the end 61a.

The second coating 64 includes a conductive part 64a composed of conductive fluororesin which covers the outer peripheral surface of the first coating 62 including one end 63a of the shield wire 63 near a predetermined position along the direction R in which the core wire 61 extends, and an insulator 64b composed of an insulative fluororesin which covers the parts other than near the predetermined position along the direction R in which the core wire 61 extends.

Then, for example as shown in FIG. 14, the conduction type liquid level detection apparatus 60 is set so that the direction R in which the core wire 61 extends is parallel to the vertical direction, and the end 61a of the core wire 61 is positioned vertically below the other end 61b. In this state, if the level of the liquid for detection (for example, water), gradually rises in the vertical direction so that the conducting part 62a of the first coating 62 and the conducting part 64a of the second coating 64 become immersed in liquid, then an electric current flows between the conducting part 62a and the conducting part 64 through this liquid. Accordingly, compared to the normal state when the conducting part 62a of the first coating 62 and the conducting part 64a of the second coating 64 are exposed to the atmosphere (OFF state), the electric current value detected by the current sensor connected to the shield wire 63 is higher when the conducting part 62a of the first coating 62 and the conducting part 64a of the second coating 64 are immersed in liquid (ON state).

Figure 15:
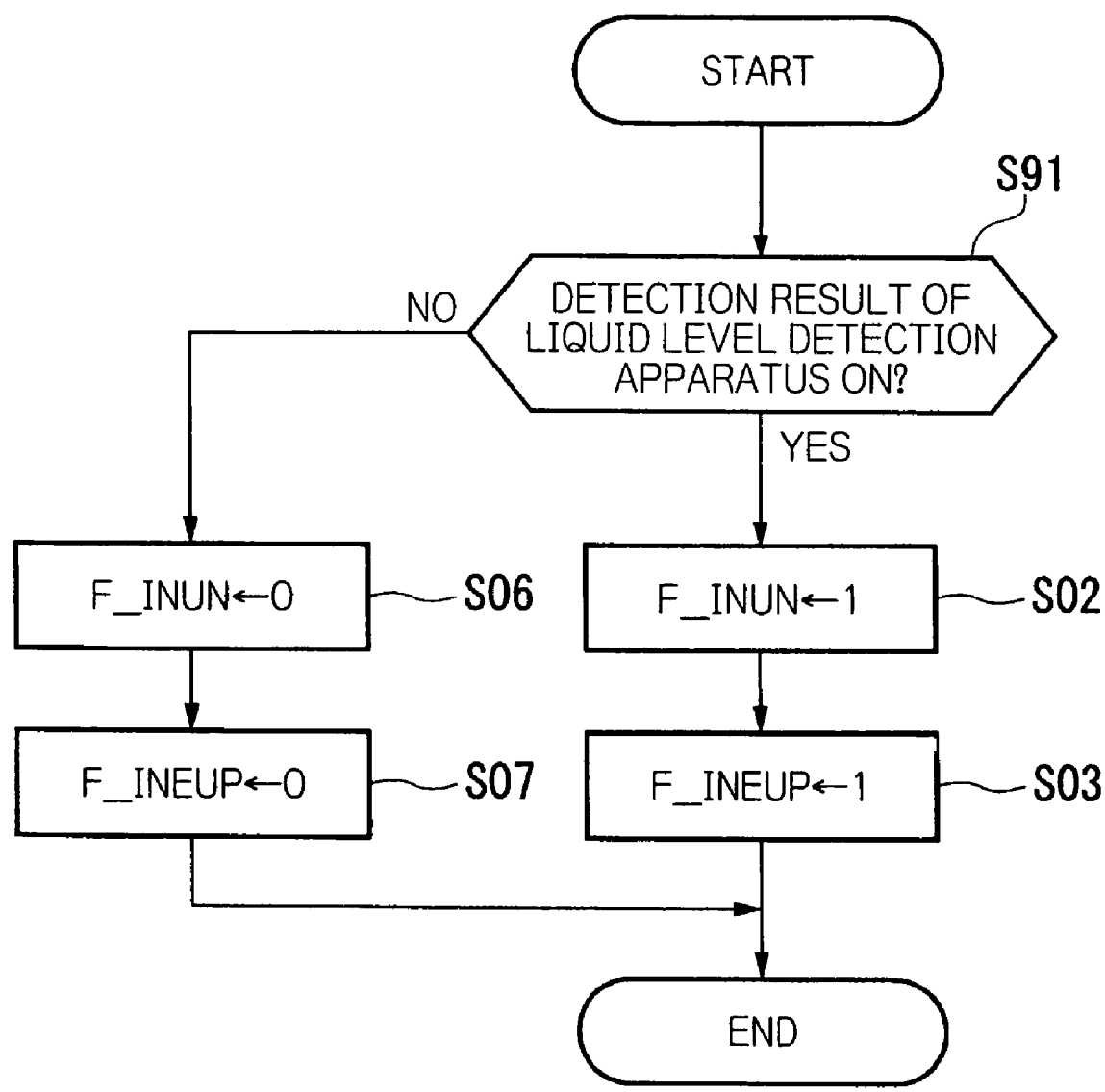
FIG. 15 is a flow chart showing processing for determining whether or not there is a possibility of flooding occurring into the internal combustion engine, in a modified example of the present embodiment.

In the operation of the control apparatus for automatic starting/stopping an internal combustion engine 10 including a liquid level detection apparatus 40, 50 or 60, in particular, in the processing in steps S01 to S07 for the determining whether there is a possibility of flooding occurring into the internal combustion engine 11 or not, the step S01 and step S04 may be omitted and as shown in FIG. 15, a step S91 may be executed instead of step S05.

In step S91, it is determined whether the detection result of the respective liquid level detection apparatus 40, 50 or 60 is the ON state or not. That is, it is determined in the float type liquid level detection apparatus 40, whether the contact point of the lead switch 43 is in the closed state or not, in the optical type liquid level detection apparatus 50, whether the detected quantity of light by the photodetector 53 has decreased below a predetermined value or not, or in the conduction type liquid level detection apparatus 60, whether the electric current value detected by the current sensor has increased above a predetermined value or not.

When the determination is "NO", the flow proceeds to step S06 described above.

On the other hand, when the determination is "YES", the flow proceeds to step S02 described above.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A control apparatus for automatic starting/stopping an internal combustion engine which automatically stops or automatically starts an internal combustion engine provided as a driving source of a vehicle, depending on a driving state of the vehicle, comprising;
    a flooding determination device which determines whether there is a possibility of flooding into an exhaust system of said internal combustion engine or not; and
    an automatic stop prohibiting device which prohibits the execution of automatic stopping of said internal combustion engine in a case where said flooding determination device determines that there is a possibility of flooding into the exhaust system of said internal combustion engine.

2. A control apparatus for automatic starting/stopping an internal combustion engine according to claim 1, further comprising a starting device which automatically starts said internal combustion engine when in a stopped condition, in a case where said flooding determination device determines that there is a possibility of flooding into the exhaust system of said internal combustion engine.

3. A control apparatus for automatic starting/stopping an internal combustion engine according to claim 1, further comprising a temperature sensor which detects an exhaust gas temperature or a property related to the temperature of said exhaust gas, wherein
    said flooding determination device determines whether there is a possibility of flooding into the exhaust system of said internal combustion engine or not based on a detection value output from said temperature sensor.

4. A control apparatus for automatic starting/stopping an internal combustion engine according to claim 3, comprising a plurality of said temperature sensors, wherein
    said flooding determination device determines whether there is a possibility of flooding into the exhaust system of said internal combustion engine or not based on a difference between two detection values output from any two of said plurality of temperature sensors.

5. A control apparatus for automatic starting/stopping an internal combustion engine according to claim 1, further comprising a liquid level sensor which is provided near an exhaust vent of the exhaust system in said internal combustion engine, and detects a liquid level position of liquid for detection, or a property related to said liquid level position, wherein
    said flooding determination device determines whether there is a possibility of flooding into the exhaust system of said internal combustion engine or not based on a detection value output from said liquid level sensor.

6. A control apparatus for automatic starting/stopping an internal combustion engine according to claim 1, further comprising an engine speed increasing device which increases a target engine speed for idle operation of said internal combustion engine by a predetermined amount, in a case where said flooding determination device determines that there is a possibility of flooding into the exhaust system of said internal combustion engine.

7. A control apparatus for automatic starting/stopping an internal combustion engine according to claim 1, further comprising a motor which is provided as a driving force for said vehicle separate to said internal combustion engine, and a prohibition device which prohibits execution of the automatic stopping operation of said internal combustion engine or prohibits the execution an operation to drive the vehicle solely under the driving force from said the motor, in a case where said flooding determination device determines that there is a possibility of flooding into the exhaust system of said internal combustion engine.

8. A control apparatus for automatic starting/stopping an internal combustion engine according to claim 7, further comprising a control device which switches from a state where said internal combustion engine in a stopped condition is automatically started, or where the vehicle is driven solely under the driving force from said motor, to a state where the vehicle is driven under the driving force from said internal combustion engine, in a case where said flooding determination device determines that there is a possibility of flooding into the exhaust system of said internal combustion engine.

* * * * *